United States Patent Office 3,350,358
Patented Oct. 31, 1967

3,350,358
PROCESS FOR PREPARING ESSENTIALLY ASH-FREE POLYMERS OF ALDEHYDES
Hugh J. Hagemeyer, Jr., Longview, and William T. Brady, Denton, Tex., assignors to Eastman Kodak Company, Rochester, N.Y., a corporation of New Jersey
No Drawing. Continuation of application Ser. No. 248,200, Dec. 31, 1962. This application July 22, 1966, Ser. No. 568,098
11 Claims. (Cl. 260—67)

This case is a continuation of application Ser. No. 248,200 filed by Hugh J. Hagemeyer, Jr., and William T. Brady on Dec. 31, 1962, now abandoned.

This invention relates to high molecular weight polyaldehydes having an extremely low ash content, and more particularly to an improved process for preparing these essentially ash-free polymeric materials.

It is known that when organometallic catalysts are employed in various polymerization processes that the resulting polymers contain a relatively high proportion of catalyst residues on the order of 0.5 weight percent or more. Such catalyst residues have an adverse effect on the thermal stability of most polymers and also result in many cases of undesirable coloration of the product. This has been found particularly true in the case of the polyaldehydes. Accordingly, various processes for the removal of catalyst residues from polyaldehydes have been produced including simple washing of the isolated polymer with organic solvents or with aqueous solutions of complexing agents for metal ions such as ammonia or hydrazine. Sequestering agents have also been proposed for extraction of the isolated catalyst containing polyaldehyde. However, it has been noted that while these prior art processes do result in some improvement in ash content of the polyaldehyde product, they are not entirely satisfactory for commercial applications since they involve additional steps and the products produced still tend to show haze and to discolor during processing and subsequent working.

We have now discovered that superior polyaldehydes characterized by very low ash content and good color stability and clearness can be produced by quenching the polymerization by the addition directly to the reaction mixture of a suitable chelating or complexing agent, and thereafter isolating the polyaldehyde product by filtration followed by simple washing with an organic solvent such as acetone and drying. Treatment of the polymer with the chelating or complexing agent at this stage is critical because treating the polymer after it has been worked up and dried results in essentially no substantial lowering of the ash content. The ash on the polyaldehyde usually runs about 0.5% or more with no treatment with a chelating agent and consistently less than 0.01% when treated according to the invention. The polymers produced with the quenching technique as described above are useful as plastic materials for the preparation of high quality filaments, fibers, sheet materials and molded articles of regular and irregular form.

It is, accordingly, an object of the invention to provide improved polyaldehyde polymers. Another object is to provide a process for producing essentially ash-free and color stable polyaldehydes. Other objects will become apparent from the description and examples.

In accordance with the invention, we prepare our improved polyaldehydes, i.e. polymers that may also be termed polyoxymethylene and substituted polyoxymethylenes, by the polymerization under anhydrous conditions of an aldehyde of the general formula:

R—CHO wherein R is hydrogen or an alkyl group of from 1–4 carbon atoms, e.g. formaldehyde or polymers thereof such as paraformaldehyde, acetaldehyde, propionaldehyde, n-butyraldehyde, isobutyraldehyde and 3-methylbutyraldehyde, at a temperature below 0° C., preferably below —40° C. and desirably at from about —70 to —100° C., i.e. an overall operable range of about from —1 to —100° C. in the presence of an organometallic catalyst such as an aluminum trialkyl, an aluminum dialkyl chloride, an alkali metal alkyl, for example, lithium alkyl and a zinc dialkyl, wherein the said alkyl in each instance is a group of from 1–4 carbon atoms, e.g. methyl, ethyl, butyl, isobutyl, etc. groups, and then quenching the polymerization by addition to the reaction mixture of a chelating or complexing agent in the form of a 5–10% solution thereof in an inert solvent, preferably a monohydroxy alkanol of from 1–5 carbon atoms, e.g. methol, propanol, butanol, pentanol, etc., the polymer being separated thereafter by filtration and washing preferably with an organic nonsolvent for the polymer such as acetone. The amount of the organometallic catalyst can vary widely, but preferably about from 0.1 to 1%, based on the weight of the aldehyde to be polymerized. The catalyst is conveniently employed as a solution in an inert hydrocarbon solvent, for example, in heptane. The amount of the chelating or complexing agent can also vary widely, but efficacious results are obtained by employing about from 4 to 40 parts by weight of the said agent per part by weight of the organometallic catalyst. Advantageously, the polymerizations are carried out in an inert liquid organic solvent, for example, n-heptane, dry mineral spirits, etc. However, good results are also obtainable by the process of the invention without the use of a solvent media. A stabilizing agent such as a secondary or tertiary aromatic amine, e.g. diphenylamine, triphenylamine, N-butylaniline, etc. can also be added with advantage to the reaction mixture.

Suitable chelating or complexing agents include 1,3-dicarbonyl compounds such as diketones, keto esters, keto acids, citric acid, ethylenediamine tetraacetic acid, etc. The preferred chelating agents are 1,3-dicarbonyl compounds represented by the general formula:

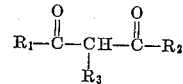

wherein $R_1$, $R_2$ and $R_3$ are similar or different members selected from the group consisting of hydrogen, hydroxyl or alkoxy or alkyl groups containing from 1 to 4 carbon atoms. Typical examples include acetoacetic acid, acetylacetone, propionylacetone, methyl acetoacetate, ethyl acetoacetate, methyl propionylacetate, and the like. The preferred chelating compound is acetylacetone which is especially efficacious in the process of the invention. While the exact reasons for the outstanding results obtained by the process of the invention are not known, it is believed that as the polymer is in the form of a gel at the time (previously mentioned as being critical) of addition of the chelating agent a much more intimate contact is thereby made possible, whereas in prior processes wherein the polymer is first isolated, it is difficult or even in some cases impossible for the chelating or complexing agent to get to and remove the metal residues from the relatively compact polymer particles or clusters.

The following examples will serve further to illustrate the manner of practicing the invention.

*Example 1*

This example illustrates the preparation of essentially ash-free and color stable poly(isobutyraldehyde).

Into a 500 ml. separatory funnel under a nitrogen atmosphere was distilled approximately 85 ml. (67.5 g.) of dry isobutyraldehyde. This monomer was slowly added under a nitrogen atmosphere to a reaction mixture in a 500 ml. resin flask consisting of 300 ml. of dry mineral spirits, 2 g. of diphenylamine and 1.9 ml. (0.34 g.) of 25% aluminum triethyl in heptane with stirring at about −70° C. Polymerization began almost immediately. The addition of monomer was made over a 20-minute period. Stirring was continued at this low temperature for a period of about two hours. The reaction mixture was transferred to a 1-liter, 3-necked flask containing 200 ml. of 5% acetylacetone in isobutanol. This mixture was stirred vigorously for two hours while the contents of the flask warmed up to room temperature. At this point, it is usually necessary to add an additional 100 ml. of isobutanol to form a filterable slurry under a high speed blender, after which the slurry was filtered. The polymer obtained was suspended in acetone, slurried again in the blender and filtered. This was repeated four times. The polymer was then sucked dry on a Buchner filter and then further dried in a vacuum oven at 55° C. for two hours. There was obtained 33.5 g. of snow-white powder with an ash content of 0.009%. It was identified as poly(isobutyraldehyde). Buttons molded therefrom were tough, haze-free and almost colorless.

The above procedure was repeated exactly except that the acetylacetone was omitted. The polymer obtained in this case contained approximately 0.5 weight percent of ash, and the buttons molded therefrom showed considerable haze and mottled color.

*Example 2*

This example illustrates the preparation of essentially ash-free and color stable poly(n-butyraldehyde).

A 2.0 g. portion of diphenylamine was placed in a 500 ml. resin flask, and under a nitrogen atmosphere, 300 ml. of dry mineral spirits was added. This mixture was cooled in a Dry Ice-isopropyl alcohol bath with stirring and 3.75 ml. (0.674 g.) of 25% aluminum triethyl in heptane was charged. Then n-butyraldehyde, which was dry and had been freshly distilled under a nitrogen atmosphere into a 250 ml. funnel, was connected to the resin flask and slowly introduced into the reaction mixture. The polymerization began almost immediately and proceeded very rapidly. When stirring became difficult, the polymerization was quenched with the addition of 200 ml. of 5% acetylacetone in isobutanol. Stirring was continued for 1.5 hours as the reaction mixture warmed to room temperature. The mixture was slurried in a high-speed blender and filtered. The polymer was slurried four or five times with acetone in the blender, filtering after each slurry. The polymer was dried at 60° C. in a vacuum oven for several hours. There was obtained 16.5 g. of snow-white poly(n-butyraldehyde). It contained no measurable ash and was useful for the preparation of clear, tough and color stable films and sheets.

*Example 3*

This example illustrates the preparation of essentially ash-free and color stable polyformaldehyde.

A few grams of paraformaldehyde was placed in a 500 ml., 3-necked flask and pyrolyzed allowing the formaldehyde vapors to pass through two ice traps cooled to −15° C. and then into a reaction mixture in a 500 ml., 3-necked resin flask containing 2 grams of diphenylamine, 300 ml. of dry mineral spirits and 3.75 ml. (0.674 g.) of 25% aluminum triethyl in heptane cooled to −70° C. Polymer began to form almost immediately upon contact of the monomer with the catalyst containing solution, as evidenced by finely divided white particles dispersed in the mixture. After 15 to 20 minutes, the run was terminated with 200 ml. of 5% acetylacetone in isobutanol. This mixture was stirred for about an hour while the mixture was allowed to warm to room temperature. The polymer was filtered and washed repeatedly with acetone in a high speed blender. The polymer was dried several hours to yield 4.5 g. of snow-white powdery polyformaldehyde. It contained only a trace of ash and gave clear, tough shaped articles that showed greatly improved thermal stabilities as compared with the polyformaldehyde product obtained under the same conditions, but without any acetylacetone.

It will be apparent from the preceding description and examples that other of the polyaldehydes coming within the invention can likewise be prepared. Thus, essentially ash-free and color-free poly(acetaldehyde), poly(propionaldehyde) and poly(3-methylbutyraldehyde) having similar good thermal stability are readily obtainable by the process of for instance above Example 1. Also, in place of the acetylacetone in above Examples 1–3 there may be substituted any other of the mentioned 1,3-dicarbonyl compounds to give generally similar good results.

All of the polymers of the invention may be modified with advantage by addition of thermal stabilizers, antioxidants, pigments, dyes, fibers, and the like materials.

The invention has been described in detail with particular reference to preferred embodiments thereof, but it will be understood that variations and modifications can be effected within the spirit and scope of the invention as hereinabove described and as defined in the appended claims.

We claim:

1. A process for preparing an ash-free aldehyde polymer which comprises (1) polymerizing an aldehyde having the formula:

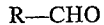

wherein R represents hydrogen or an alkyl group containing from 1 to 4 carbon atoms, in the presence of a catalyst selected from the group consisting of an aluminum trialkyl, an aluminum dialkyl chloride, an alkali metal alkyl and a zinc alkyl wherein in each instance the alkyl groups contain from 1 to 4 carbon atoms at a temperature of from −1 to −100° C., (2) quenching polymerization reaction mixture containing an aldehyde polymer with a 1,3-dicarbonyl compound having the general formula:

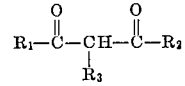

wherein $R_1$, $R_2$ and $R_3$ each represents a member selected from the group consisting of a hydrogen atom, a hydroxyl group, an alkoxy group containing from 1 to 4 carbon atoms and an alkyl group containing from 1 to 4 carbon atoms, and (3) separating substantially ash-free polymer from resulting mixture.

2. The process of claim 1 wherein the said 1,3-dicarbonyl compound is present in an amount of from 4–40 parts by weight per part by weight of said catalyst.

3. The process of claim 1 wherein the said 1,3-dicarbonyl compound is added in the form of a solution thereof in a monohydroxy alkanol of from 1–5 carbon atoms.

4. The process of claim 1 wherein an amine selected from the group consisting of a secondary arylamine and a tertiary arylamine is included as a stabilizer in said step (1).

5. A process for preparing an ash-free polyformaldehyde which comprises polymerizing formaldehyde in the presence of aluminum triethyl at a temperature of from −1 to −100° C., quenching polymerization reaction mixture containing formaldehyde polymer with acetylacetone, and separating substantially ash-free polymer from resulting mixture.

6. A process for preparing ash-free poly(n-butyraldehyde) which comprises polymerizing n-butyraldehyde in the presence of aluminum triethyl at a temperature of from −1 to −100° C., quenching polymerization reaction mixture containing n-butyraldehyde polymer with acetylacetone, and separating substantially ash-free polymer from resulting mixture.

7. A process for preparing ash-free poly-isobutyraldehyde) which comprises polymerizing isobutyraldehyde in the presence of aluminum triethyl at a temperature of from −1 to −100° C., quenching polymerization reaction mixture containing isobutyraldehyde polymer with acetylacetone, and separating substantially ash-free polymer from resulting mixture.

8. The process according to claim 5 wherein diphenylamine is used as a stabilizer during the polymerization step.

9. The process according to claim 6 wherein diphenylamine is used as a stabilizer during the polymerization step.

10. The process according to claim 7 wherein diphenylamine is used as a stabilizer during the polymerization step.

11. A process for removing residues of catalysts from the group consisting of an aluminum trialkyl, an aluminum dialkyl chloride, an alkali metal alkyl and a zinc alkyl, wherein in each instance the alkyl groups contain from 1 to 4 carbon atoms, from polymers of saturated, aliphatic aldehydes containing from 1 to 5 carbon atoms, which comprises quenching the polymerization reaction mixture with a 1,3-dicarbonyl compound having the general formula:

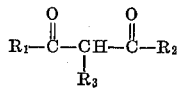

wherein $R_1$, $R_2$ and $R_3$ each represents a member selected from the group consisting of a hydrogen atom, a hydroxyl group, an alkoxy group containing from 1 to 4 carbon atoms and an alkyl group containing from 1 to 4 carbon atoms.

References Cited

UNITED STATES PATENTS

| | | | |
|---|---|---|---|
| 2,919,261 | 12/1959 | Christenson et al. | 260—64 |
| 2,920,059 | 1/1960 | MacDonald et al. | 260—67 |
| 3,016,297 | 1/1962 | Mochel et al. | 260—64 |
| 3,098,845 | 7/1963 | Cull et al. | 260—94.95 |
| 3,208,975 | 9/1965 | Vandenberg | 260—67 |
| 3,216,972 | 11/1965 | Sidi | 260—67 |
| 3,267,076 | 8/1966 | Ishii et al. | 260—67 |

FOREIGN PATENTS 220,367   3/1962   Austria.

OTHER REFERENCES

Dervent: Belgian Patents Reports, vol. 75A (May 1961).

WILLIAM H. SHORT, *Primary Examiner.*

L. M. P. HYNES, *Assistant Examiner.*